United States Patent [19]

Seo et al.

[11] Patent Number: 4,851,939
[45] Date of Patent: Jul. 25, 1989

[54] ACTUATOR DRIVING APPARATUS AND MAGNETIC DISK DRIVE SYSTEM WITH A SMALLER NUMBER OF HIGH POWER AMPLIFIERS THAN ACTUATORS

[75] Inventors: Yosuke Seo, Sagamihara; Yoshiyuki Hirano, Yono; Hajime Aoi, Tachikawa; Takashi Tamura, Kokubunji; Kazuyoshi Nakabayashi, Odawara, all of Japan

[73] Assignee: Hitachi, Ltd., Tokyo, Japan

[21] Appl. No.: 48,587

[22] Filed: May 11, 1987

[30] Foreign Application Priority Data

May 16, 1986 [JP] Japan .................. 61-110768

[51] Int. Cl.[4] .................. G11B 5/55; G11B 5/596
[52] U.S. Cl. .................. 360/77.02; 360/61; 360/75; 360/78.04
[58] Field of Search .................. 360/61, 69, 77, 78, 360/75, 98, 99

[56] References Cited

U.S. PATENT DOCUMENTS

| | | | |
|---|---|---|---|
| 4,086,636 | 4/1978 | Cizmic et al. | 360/98 |
| 4,381,526 | 4/1983 | McLaughlin et al. | 360/77 |
| 4,423,448 | 12/1983 | Frandsen | 360/78 |
| 4,544,968 | 10/1985 | Anderson et al. | 360/78 |
| 4,575,776 | 3/1986 | Stephens et al. | 360/78 |
| 4,669,004 | 5/1987 | Moon et al. | 360/78 |
| 4,724,369 | 2/1988 | Hashimoto | 360/78 |

FOREIGN PATENT DOCUMENTS 55-12528 1/1980 Japan.
61-261865 11/1986 Japan.

Primary Examiner—Aristotelis M. Psitos
Assistant Examiner—David L. Robertson
Attorney, Agent, or Firm—Antonelli, Terry & Wands

[57] ABSTRACT

In a magnetic disk drive apparatus having a plurality of actuators, or a magnetic disk drive system constructed of a plurality of head disk assemblies (HDA's); a magnetic disk drive apparatus or system in which the actuators included in the above apparatus or system can be arbitrarily and selectively coupled with a plurality of access control circuits and high power amplifiers that are smaller in number than the actuators.

10 Claims, 3 Drawing Sheets

ACTUATOR DRIVING APPARATUS AND MAGNETIC DISK DRIVE SYSTEM WITH A SMALLER NUMBER OF HIGH POWER AMPLIFIERS THAN ACTUATORS

BACKGROUND OF THE INVENTION

The present invention relates to a magnetic disk drive apparatus or system, and more particularly to an actuator driving method which is well suited to a magnetic disk drive apparatus having a large number of actuators or a magentic disk drive system including a large number of HDA's (Head Disk Assemblies).

As an invention pertinent to a method of driving a large number of actuators, Japanese Patent Application Laid-open No. 55-12528 discloses a method which shares a coarse servo circuit for a plurality of actuators carried on a disk drive apparatus, thereby intending to attain reduction in cost. With this method, however, the lowering of throughput occurs due to the fact that the plurality of actuators cannot be simultaneously accessed. Another problem is that, since an expensive, high power amplifier for a high speed access control is shared in a track following positioning control, the cost rises.

SUMMARY OF THE INVENTION

An object of the present invention is to provide, in a disk drive apparatus having a large number of actuators or a disk drive system including a large number of head disk assemblies (HDA's), an inexpensive disk drive apparatus or system without degrading the performance of the system.

The object is accomplished by a disk drive apparatus having a large number of actuators or a disk drive system including a large number of HDA's, in which a plurality of access control circuits and high power amplifiers in a number smaller than that of the actuators are arranged so that they can be arbitrarily selected and coupled with the large number of actuators.

In view of the usage of a conventional storage system, even in the disk drive system having a large number of actuators, the number of heads to be simultaneously occupied by a CPU is limited by the number of channels with the CPU. Accordingly, the actuators to be simultaneously accessed need not be all but may be in a small number. Therefore, when the plurality of access control circuits or high power amplifiers smaller in number than the actuators are shared among the actuators as in the present invention, the access control circuits or the high power amplifiers can be efficiently operated without incurring the lowering of throughput, so that reduction in a mounting space and reduction in cost can be attained.

DESCRIPTION OF THE PREFERRED EMBODIMENTS

Figure 1:
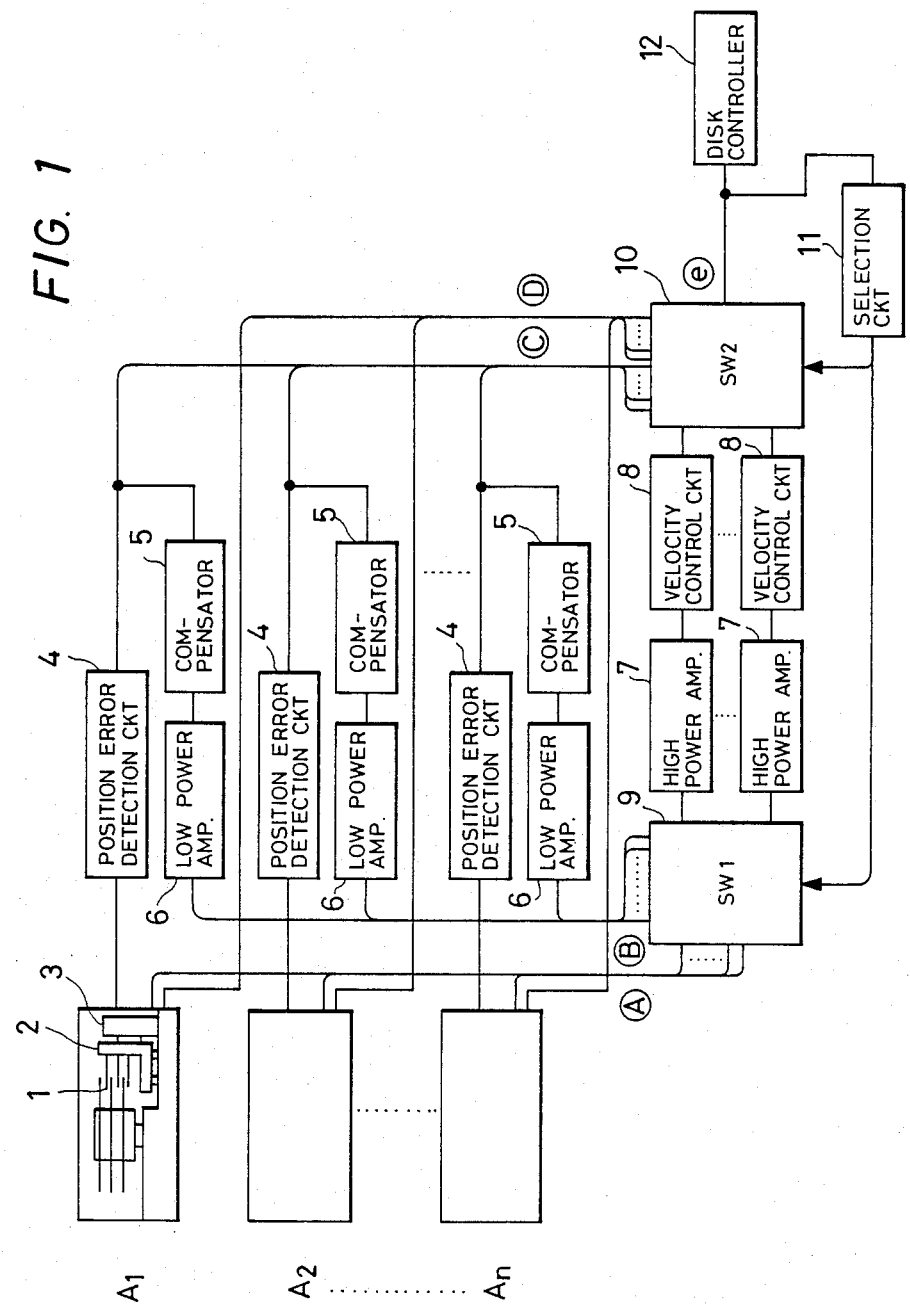
FIG. 1 is a block diagram showing an embodiment of the present invention.
Figure 2:
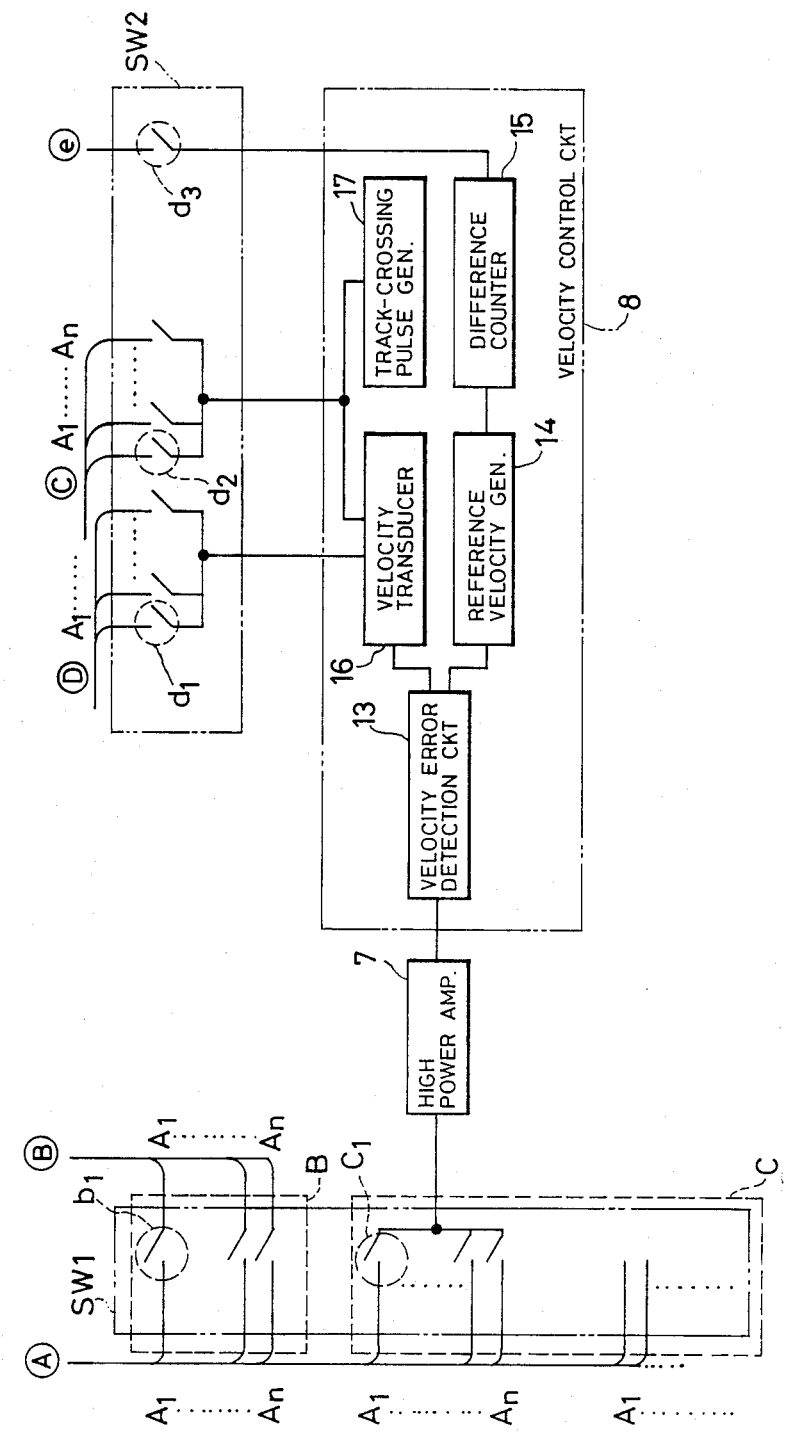
FIG. 2 is a block diagram showing a velocity control circuit in the present invention.

Now, an embodiment of the present invention will be described with reference to FIGS. 1 and 2. FIG. 1 illustrates an arrangement in which a large number of HDA's indicated at symbols $A_1$-$A_n$ share a smaller number of access circuits and high power amplifiers, while FIG. 2 illustrates the arrangement of a velocity control circuit in FIG. 1. In order to facilitate the understanding of operations, one of the HDA's will be mentioned for elucidating the position control and the velocity control.

It is assumed that the head 1 of the HDA $A_1$ is following a certain target track. Then, a servo circuit is in a position control status. Under the position control status, a position signal read by the head 1 is converted by a position error detection circuit 4 into a position error signal which expresses the positional deviation magnitude of the head from the track, and a signal is fed back to the HDA $A_1$ so that the position error signal may become "0" at all times. On that occasion, a compensator 5 is employed for keeping the stability of a closed loop. In FIG. 1, the closed loop extends along portions 1 - 4 - 5 - 6 - 9 - 3 - 1. Here, the portion 6 is a low power amplifier dedicated to the following operation, and the portion 3 is a voice coil motor. The portion 9 is a switch bank SW1 for changingover the velocity control and the position control. In the present invention, letting n denote the number of the HDA's and m (m<n) denote the number of the velocity control circuits, the switch bank SW1 consists of n switches for the position control and n x m switches for the velocity control. Under the position control status of the HDA $A_1$, a switch $b_1$ in the position controlling switch group B of the switch bank SW1 is closed, whereas switches $c_1$ corresponding to the HDA $A_1$ in the velocity controlling switch group C of the switch bank SW1 are opened. By the way, numeral 2 in FIG. 1 denotes a carriage.

Next, let's consider a case where the head 1 is accessed from a certain track (Tr) to a target Tr in the HDA $A_1$. First, when an access instruction from a disk controller (DKC) 12 toward the HDA $A_1$ has arrived, one of the velocity control circuits 8 not connected with any HDA is selected by a selection circuit 11. Although not especially restricted, an algorithm for the selection should desirably realize a random selection. The velocity control circuit 8 selected by the selection circuit 11 is connected with the corresponding switches of the switch bank SW1 at numeral 9 and a switch bank SW2 at numeral 10 by the signals of this selection circuit. At that time, the position control loop is opened. That is, the switch $b_1$ of the position controlling switch group B of the switch bank SW1 in FIG. 2 is opened, whereas one of the switches $c_1$ of the velocity controlling switch group C is closed to connect the HDA $A_1$ to the selected velocity control circuit 8. Likewise, signal lines Ⓒ, Ⓓ and Ⓔ are connected to the selected velocity control circuit 8. The signal of the line D is information on current flowing through the voice coil motor 3, and the signal of the line Ⓒ is a position error signal.

The velocity control will now be described assuming that, in the illustration of FIG. 2, the switch $b_1$ of the position controlling switch group B of the switch bank SW1 be opened with one of the switches $c_1$ of the velocity controlling switch group C closed, while three switches $d_1$, $d_2$ and $d_3$ respectively corresponding to the signal lines Ⓓ, Ⓒ and Ⓔ in the switch bank SW2 be closed. A movement track magnitude from the disk controller 12 is loaded in a difference counter 15 via the signal line Ⓔ. A velocity error detection circuit 13 detects a velocity error on the basis of a signal from a reference velocity generator 14 corresponding to the value of the difference counter 15 and a signal from a velocity transducer 16, and a current corresponding to the velocity error is caused to flow through the coil of the voice coil motor 3 by a high power amplifier 7. The value of the difference counter 15 is decremented by the signal of a track-crossing pulse generator 17 each time the head 1 crosses a track. Thus, when the above value has become zero, the apparatus is brought back into the position control status at a proper timing. In the case of FIG. 2, the velocity transducer 16 signifies an electronic tachometer which evaluates a velocity on the basis of the current flowing through the voice coil motor 3 and the differential of the position error signal. Therefore, in a case where each HDA is furnished with a mechanical tachometer, the velocity signal of this tachometer is directly applied to the velocity error detection circuit 13 instead of the current. When the operation of the apparatus is restored to the position control again after the target track has been reached, the switch $c_1$ of the velocity controlling switch group C of the switch bank SW1 and the switches $d_1$, $d_2$ and $d_3$ of the switch bank SW2 are opened again, and the velocity control circuit 8 falls again into a stand-by status in which it can be connected with any desired HDA.

Figure 3:
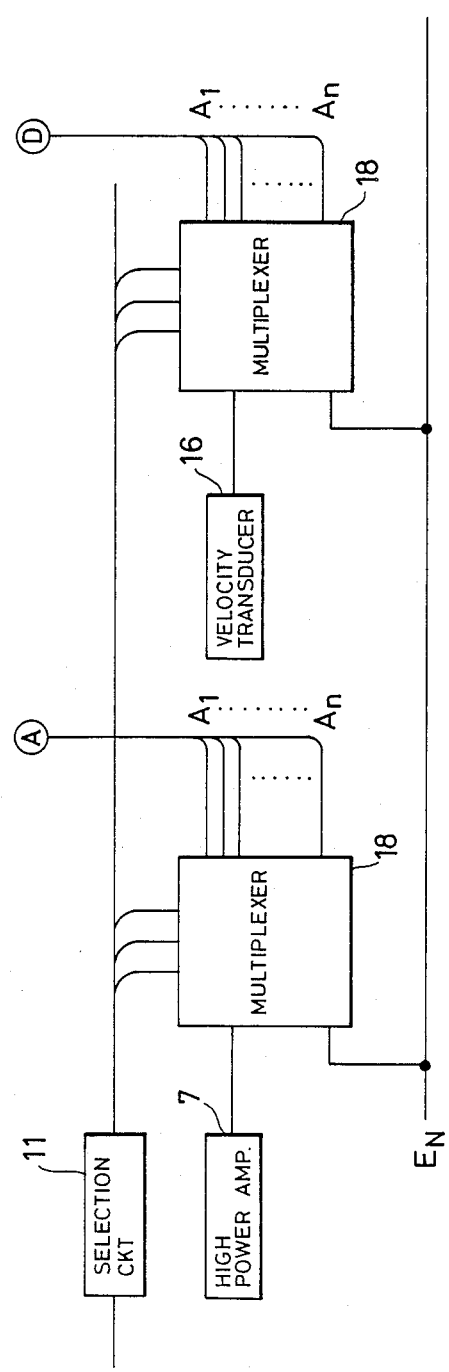
FIG. 3 is a diagram for explaining a signal selection circuit.

Desirably, the switch bank SW1 or SW2 is constructed of an analog multiplexer as shown in FIG. 3. The analog multiplexer 18 functions to select one signal from among a large number of analog signal lines. In the example of FIG. 3, a signal selected by the combination of binary signals from the selection circuit 11 is delivered as the output of the multiplexer 18. A signal $E_N$ sets the "enable" status of the multiplexers 18.

Since, in the present invention, the number of the velocity control circuits is smaller than that of the HDA's, the heads of all the HDA's cannot be simultaneously moved to "0" track positions at the start of the apparatus. However, the HDA's may be accessed by switching the velocity control circuits in succession, and no special consideration is required. Besides, as explained in conjunction with the embodiment, the present invention is characterized by being configured of the velocity control portions smaller in number than the actuators. Therefore, the invention is also applicable to a case where a large number of actuators are mounted on a single disk drive apparatus. In this manner, the present invention shall not be restricted as to the control setup, the number of connected units, etc.

According to the present invention, a plurality of velocity control circuits and high power amplifiers (numbering n) and desired 1 ($1 \leq n$) actuators among actuators (numbering m) in a number larger than n can be arbitrarily coupled without overlapping, and hence, up to n actuators can be simultaneously accessed, so that components can be efficiently utilized, and a disk drive apparatus or system which is inexpensive and whose installation space is small can be provided.

What is claimed is:
1. An actuator driving apparatus for a magnetic disk drive system comprising:
    (1) a plurality of recording media which can magnetically record and reproduce information,
    (2) a plurality of heads which record and reproduce predetermined information on and from said recording media,
    (3) a plurality of actuators which drive said heads,
    (4) actuator control means for controlling said actuators, said actuator control means having a plurality of high power amplifiers for driving said actuators to enable accessing by said heads, said plurality of high power amplifiers being smaller in number than said plurality of actuators,
    (5) disk control mens for generating signals which serve to move said heads from predetermined positions to target positions on said recording media,
    (6) selection means for selecting a proper one of said plurality of high power amplifiers in accordance with the signals from said disk control means so as to connect the selected high power amplifier to one of the actuators, and
    (7) a plurality of low power amplifiers for driving the actuators to follow said heads on the target positions.

2. A magnetic disk drive apparatus or system according to claim 1, wherein said actuator control means further includes a plurality of power amplifiers which drive said actuators and which are smaller in number than said actuators.

3. An apparatus or system according to claim 2, wherein said velocity control circuit is an access control circuit which moves said head from the predetermined position to the target position on the recording medium.

4. An apparatus according to claim 3, wherein said actuator control means further includes position control circuits which cause said heads to follow predetermined tracks on said recording media, and said selection means selects said position control circuits or the selected access control circuits.

5. An apparatus according to claim 4, wherein said position control circuits are equal in number to said actuators.

6. An apparatus according to claim 1, wherein said each actuator comprises a carriage which moves the corresponding head radially of the recording medium, and a voice coil motor which drives said carriage.

7. A magnetic disk drive system comprising:
    (1) a plurality of head disk assemblies (HDA's) each of which has a recording medium capable of magnetically recording and reproducing information, a head for recording and reproducing predetermined information on and from said recording medium, and an actuator for driving said head,
    (2) actuator control means having a plurality of high power amplifiers which control said actuators to access said heads and which are smaller in number than said plurality of HDA's,
    (3) disk control means for generating signals each of which serves to move said head of said HDA from a predetermined position to a target position on said recording medium, and
    (4) selection means for selecting proper ones of said plurality of high power amplifiers in accordance with the signals from said disk control means so as to connect the selected high power amplifiers to the predetermined actuators of said HDA's, and
    (5) a plurality of servo circuits for following said heads on the target position, each of said servo circuits including a position error detector circuit for converting a position signal read by an associated head into a position error signal indicative of the positional deviation magnitude of the head from the predetermined position and a low power amplifier for driving the actuator in accordance with the error signal.

8. A magnetic disk drive system according to claim 7, wherein said actuator control means further includes a plurality of power amplifiers which drive said actuators and which are smaller in number than said actuators.

9. A magnetic disk drive system according to claim 7, wherein said velocity control circuit is an access control circuit which moves said head from the predetermined position to the target position on said recording medium.

10. A magnetic disk drive system according to claim 7, wherein said selection means selects said servo control circuits or the selected access control circuits.

* * * * *